United States Patent [19]

Niibori et al.

[11] 4,390,054

[45] Jun. 28, 1983

[54] APPARATUS FOR OPENING AND CLOSING A FLEXIBLE SCREEN IN A GREENHOUSE OR THE LIKE

[75] Inventors: Kenji Niibori; Toshio Ishihama, both of Oyama, Japan

[73] Assignee: Seiwa Kagaku Kabushiki Kaisha, Japan

[21] Appl. No.: 281,409

[22] Filed: Jul. 8, 1981

[30] Foreign Application Priority Data

Jul. 9, 1980 [JP] Japan .............................. 55-96769[U]
Oct. 23, 1980 [JP] Japan ............................. 55-151292[U]

[51] Int. Cl.³ .............................................. A47H 1/00
[52] U.S. Cl. .................................................... 160/265
[58] Field of Search ............... 160/84 R, 68, 265, 262, 160/263, 310; 52/63, 83; 47/17

[56] References Cited

U.S. PATENT DOCUMENTS

| | | | |
|---|---|---|---|
| 1,800,654 | 4/1931 | Nelson | 160/262 |
| 2,193,921 | 3/1940 | Gibbons | 47/17 |
| 3,180,401 | 4/1965 | Gambon et al. | 160/265 |
| 3,421,568 | 1/1969 | Youngs | 160/310 |
| 3,481,073 | 12/1969 | Yoshda et al. | 47/17 |
| 3,510,996 | 5/1970 | Popil | 160/84 R |
| 4,064,648 | 12/1977 | Cary | 47/17 |

Primary Examiner—Peter M. Caun
Attorney, Agent, or Firm—Steinberg & Raskin

[57] ABSTRACT

Apparatus for opening and closing a flexible screen in a greenhouse or the like includes a winding rod mounted for rotation about a fixed axis and to which an end edge of an elongated flexible screen is fixed, first driving apparatus for constantly applying a torque to the winding rod tending to rotate the same such that the flexible screen would be wound thereon, and traction apparatus including elongated flexible members, each of which has its two ends secured to a rotatably mounted driving shaft with respective end portions thereof oppositely coiled on the driving shaft and having two portions guided along a predetermined path of travel with one of the portions being operatively connected to the other end edge of the flexible screen, and second driving apparatus for selectively rotating the driving shaft in a normal or reverse direction.

4 Claims, 14 Drawing Figures

APPARATUS FOR OPENING AND CLOSING A FLEXIBLE SCREEN IN A GREENHOUSE OR THE LIKE

BACKGROUND OF THE INVENTION

This invention relates to opening and closing apparatus for rolling up or unrolling a flexible screen such as plastic film, sheet material, etc., of the type which is stretched in a greenhouse or the like to form a partition.

Generally, when a film or the like of continuous length is rolled up or unwound by a winding rod which rotates at a constant speed, the roll diameter increases or decreases in accordance with the amount of the film wound up or unwound, so that the winding or unwinding speed is variable even when the winding speed of the winding rod is constant. In such a case, in order to maintain the speed at which the film or the like which is wound or unwound at a constant rate, it is necessary to adjust the rotating speed of the winding rod which rotates at a fixed position. However, in order to change the rotating speed of the winding rod in accordance with the increase or decrease of the roll diameter by using driving means such as an electric motor for rotating the winding rod, a complicated speed change mechanism is required as well as adjustments thereof which are quite difficult. Further, since the rate at which the roll diameter increases or decreases also varies according to the thickness of the film or the like used, fixing the rate of change of the speed of the driving shaft greatly restricts the scope of application of the apparatus and such is therefore not practical.

SUMMARY OF THE INVENTION

The present invention has been proposed with a view to solving the above-mentioned technical problems in the prior art. Therefore, an object of this invention is to provide an apparatus for opening and closing a flexible screen in a greenhouse, said apparatus being capable of driving the flexible screen winding rod without resort to a constant-speed driving power source such as an electric motor.

Another object of this invention is to provide an apparatus for opening and closing a flexible screen in a greenhouse by using a driving power source adapted to drive the winding rod at a constant torque independently of a change in the speed of rotation of the winding rod.

Still another object of this invention is to provide an apparatus for opening and closing a flexible screen in a greenhouse using a driving power source capable of driving the winding rod in a manner which corresponds to the movement and stoppage of the elongated, flexible traction members adapted to guide the flexible screen in its rolling or unrolling movement.

Yet another object of this invention is to provide an apparatus for opening and closing a flexible screen in a greenhouse, in which the tension exerted on the flexible screen is maintained below a predetermined maximum value to eliminate the possibility of any damage to the screen due to tension.

Still another object of this invention is to provide an apparatus for opening and closing a flexible screen in a greenhouse, whereby the flexible screen can be rolled up and unrolled at a constant speed regardless of the thickness of the screen used.

A further object of this invention is to provide an apparatus for opening and closing a flexible screen in a greenhouse, said apparatus being simple in construction, easy to operate and being provided with inexpensive apparatus for driving the winding rod.

An additional object of this invention is to provide an apparatus for opening and closing a flexible screen in a greenhouse, and which includes a rolled-screen supporting member capable of rotatably and properly supporting the rolled screen regardless of any change in the roll diameter of the screen.

The above-mentioned objects of the invention are accomplished by using as the flexible screen winding rod driving power source a constant-restoring-force spring adapted to apply a constant torque to the winding rod and by providing that when it is desired to close the flexible screen, the screen is unwound against the opposing force of the spring by the tractive force of the elongated, flexible traction members, such as traction ropes.

According to the present invention, there is provided in an apparatus for opening and closing a flexible screen of a greenhouse or the like of the type wherein a rotatable winding rod is fixed to one end edge of the flexible screen and wherein the screen is opened or closed by winding the screen on the winding rod or unwinding the screen from the winding rod, the improvement comprising:

a winding rod mounted rotatably about a fixed axis of rotation;

an elongated flexible screen fixed at one end edge thereof to the winding rod;

traction apparatus operatively connected to the flexible screen, preferably at the other end edge thereof, and adapted to selectively pull said flexible screen in either one of the opening and closing directions; and first driving apparatus comprising at least one constant-restoring-force spring for rotating the winding rod so as to wind said flexible screen onto the same.

DESCRIPTION OF THE DRAWINGS

A more complete appreciation of the present invention and many of the attendant advantages thereof will be readily understood by reference to the following detailed description when considered in connection with the accompanying drawings wherein.

DETAILED DESCRIPTION OF THE PREFERRED EMBODIMENTS

Referring to the drawings, a greenhouse 1 having opposing side walls 1a and 1b has a driving shaft 2 for traction ropes disposed along the side wall 1a thereof, said driving shaft being arranged to be rotated in either one of the normal and reverse directions by a reversible prime mover M.

Figure 1:
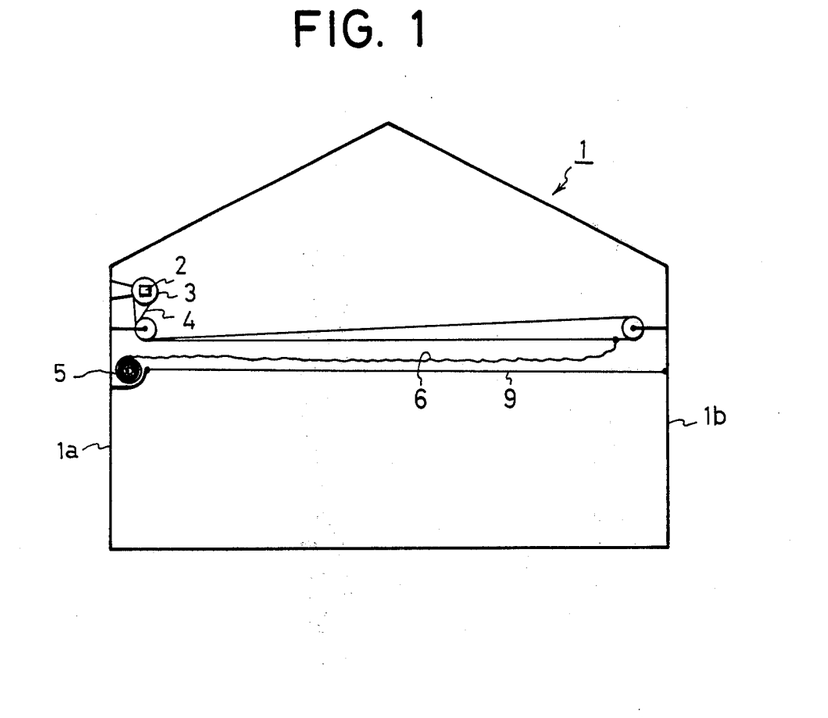
FIG. 1 is a schematic view showing an embodiment of flexible screen opening and closing apparatus according to the present invention.
Figure 2:
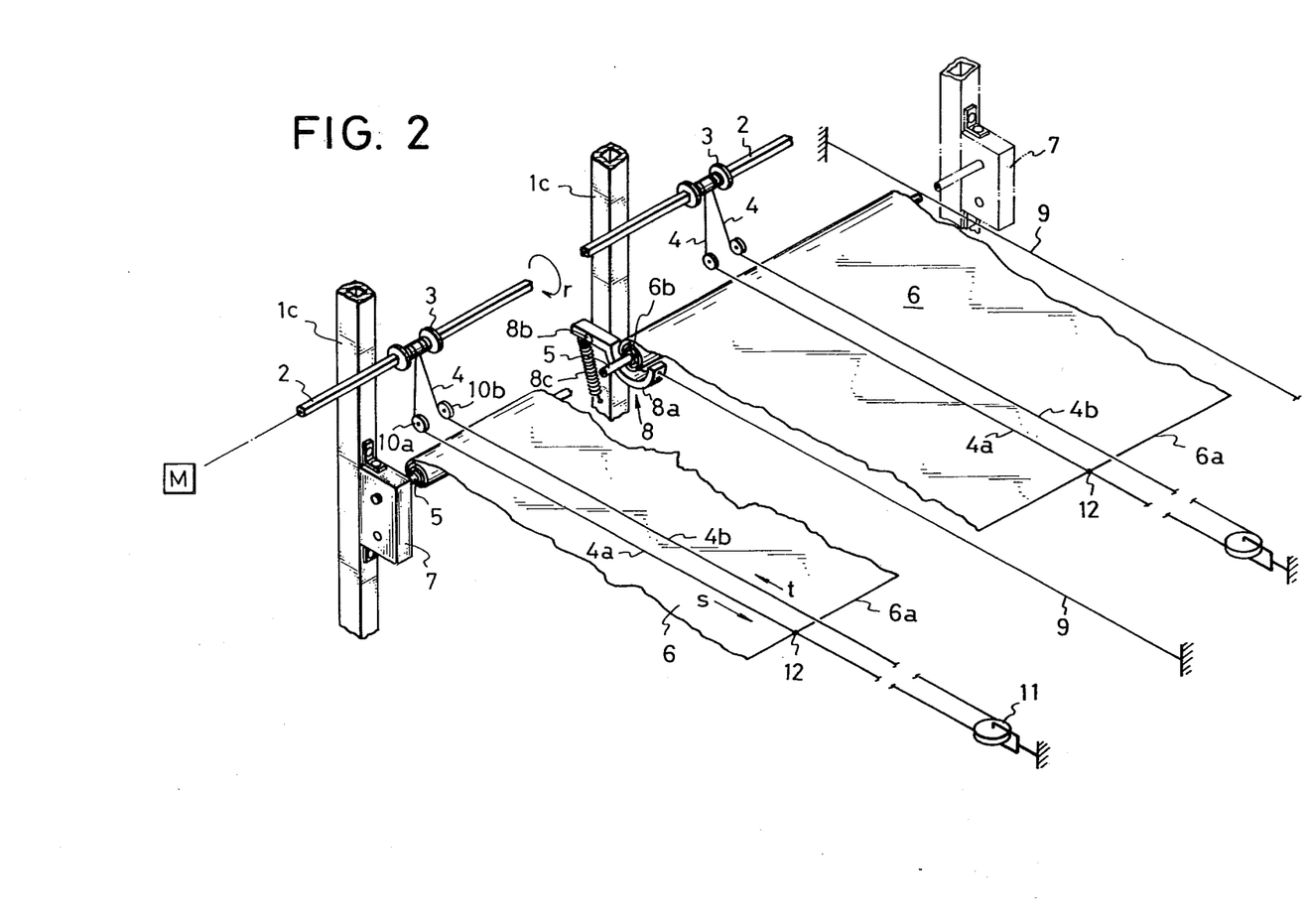
FIG. 2 is a perspective view of the internal mechanism, with parts cut away.

Traction rope take-up drums 3 are fixed on said driving shaft 2. An elongated traction rope 4 is wound on each said drums 3 such that both ends of the rope will be wound up oppositely to each other. A winding rod 5 is disposed along the side wall 1a of the greenhouse 1, with the basal end of a flexible screen 6 being secured to said winding rod 5. A driving mechanism 7 is provided for rotating said winding rod 5. Said driving mechanism 7 is operatively connected to both ends of the winding rod 5 and is fixed to a frame 1c provided on the side wall 1a of the greenhouse 1. Rolled screen supporting members 8 are provided in a predetermined number on the respective frames 1c positioned between both ends of the winding rod 5, each of said supporting members 8 comprising an arm having a curved portion 8a. Each said supporting member 8 is pivotally secured to the corresponding frame 1c by a pin 8b and is urged in the counterclockwise direction by a spring 8c. These supporting members 8 are adapted to rotatably support the rolled-up portion 6b of the screen 6. A plurality of supporting wires 9 are stretched parallel to each other beneath the screen 6 and are designed to define a partition plane in the greenhouse when the screen 6 has made its opening or closing movement. Each traction rope 4 is wound on an associated winding drum 3 through respective guide pulleys 10a, 11 and 10b which are arranged to define a pair of travelling portions 4a and 4b whose directions of movement are changed in accordance with the normal or reverse rotation of the winding drum 3. A fixing member 12 interconnects moving end edge 6a of the screen 6 and one of the travelling portions (4a in the illustrated embodiment) of each traction rope. Clamping clips may be used for such fixing member 12.

Figure 3:
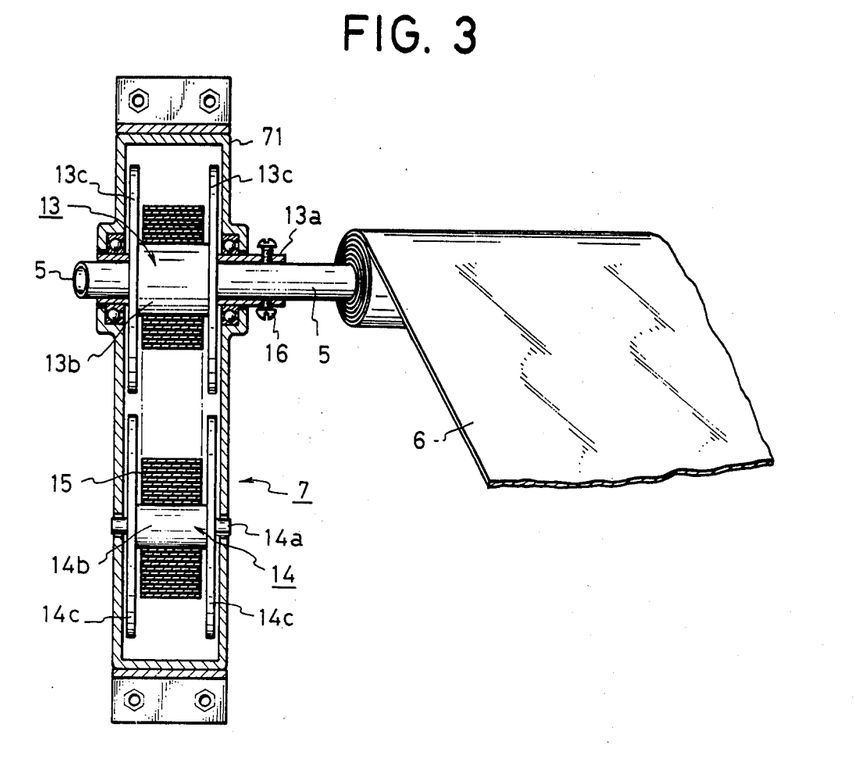
FIG. 3 is a central longitudinal sectional view showing an embodiment of driving means.

FIG. 3 illustrates a driving mechanism 7 for rotating the winding rod 5. A casing 71 is secured to an associated frame 1c (shown in FIG. 2), and an output drum 13 is rotatably supported in the casing 71 through its output shaft 13a. A main drum 14 is also rotatably supported in the casing 71 through a pivot pin 14a. A constant-restoring force coiled leaf spring 15 is provided of which one end is fixed to the coiling portion 13b of said output drum 13 while the other end is tightly coiled on, without being fixed to, the coiling portion 14b of said main drum 14. Flanges 13c and 14c are provided at both ends of said respective drums 13 and 14. These flanges are provided as required for effecting regular coiling of said leaf spring 15 on said respective drums. Clamp screws 16 are provided for fixing the winding rod 5 which is received through the tubular output shaft 13a thereto.

In operation, when the traction rope driving shaft 2 is rotated in the direction of arrow r by the prime mover M, the winding drums 3 accordingly turn in the same direction to let the travelling portions 4a and 4b of the respective traction ropes travel in the directions of arrows s and t, respectively. Thus, the moving end edge 6a of the screen 6 is pulled to move in the closing direction by means of clips 12. Since the winding rod 5 rotates while unwinding the rolled screen 6b, each output drum 13 (see FIG. 3) is accordingly turned in the same direction. As the output drum 13 turns, the spring 15 is drawn out from the main drum 14 and is simultaneously coiled up on the coiling portion 13b of the output drum 13. In the course of this operation, a torque is applied to the winding rod 5 by the unwinding force of the spring 15. However, since this spring 15 is a constant-restoring-force spring, such torque is maintained constant until draw-out of the spring from the main drum 14 is completed.

When the prime mover M is driven in the reverse direction, the travelling portions 4a and 4b of each traction rope are forced to travel oppositely to the directions of arrows s and t, respectively, thus pulling the moving end edge 6a of the screen 6 in its opening direction. Since the tension of the entire screen 6 decreases accordingly, the winding rod 5 is forced to rotate in the reverse direction by the torque built up by the unwinding force of the spring 15 to roll the screen up onto the winding rod 5. Thus, by providing that the torque produced by unwinding the spring 15 will be slightly greater than the rotational torque determined by the axial length of the winding rod 5 and the volume of screen taken up, it is possible to wind the screen up to open the partition by using the constant-restoring-force spring 15 as the power source. According to this arrangement, although both the draw-out speed of the spring 15 and the unwinding speed change as the rotating speed of the winding rod 5 increases or decreases as the roll diameter of the screen on the winding rod 5 varies, the torque produced by unwinding of the spring 15, which acts through the output drum 13, remains constant. Therefore, the screen 6 is allowed to move at the same speed as the movement of the traction ropes 4 regardless of whether the screen 6 moves in the opening or closing direction, and further, since a tension in the winding direction acts constantly on the winding rod 5, there is no possibility of causing a looseness or slackening along the partition plane.

Figure 4:
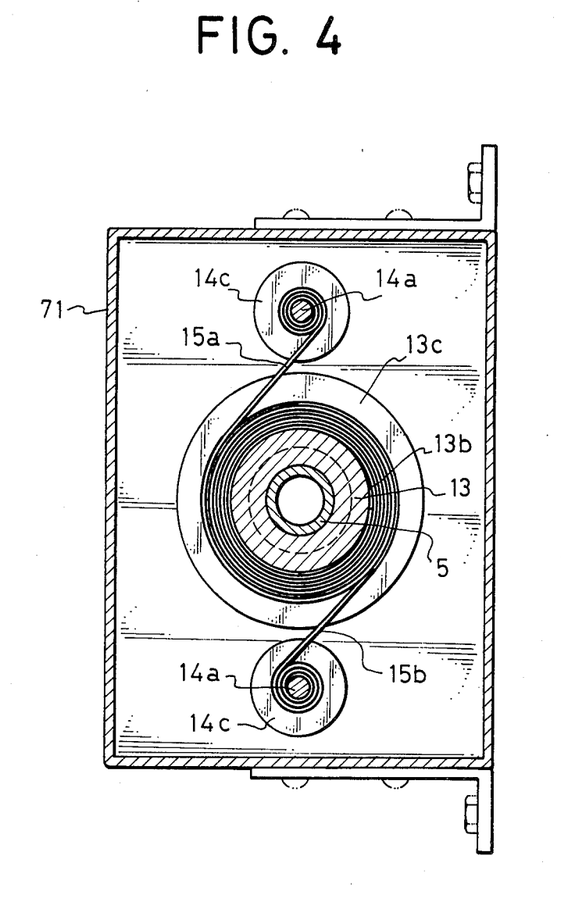
FIG. 4 is a sectional view showing another embodiment of driving means.

It is also within the scope of this invention to provide a single constant-restoring-force coiled leaf spring 15 as in the foregoing embodiment or to provide two or more such springs, e.g., springs 15a and 15b as shown in FIG. 4. In the case where two or more constant-restoring-force springs 15a, 15b are provided, they are coiled at one end on the coiling portion 13b of the output drum 13 so that they overlie each other as shown in FIG. 4. Also, if desired, said driving mechanism 7 may be provided at both ends of the single winding rod 5 as shown by the phantom lines in FIG. 2.

Figure 5A:
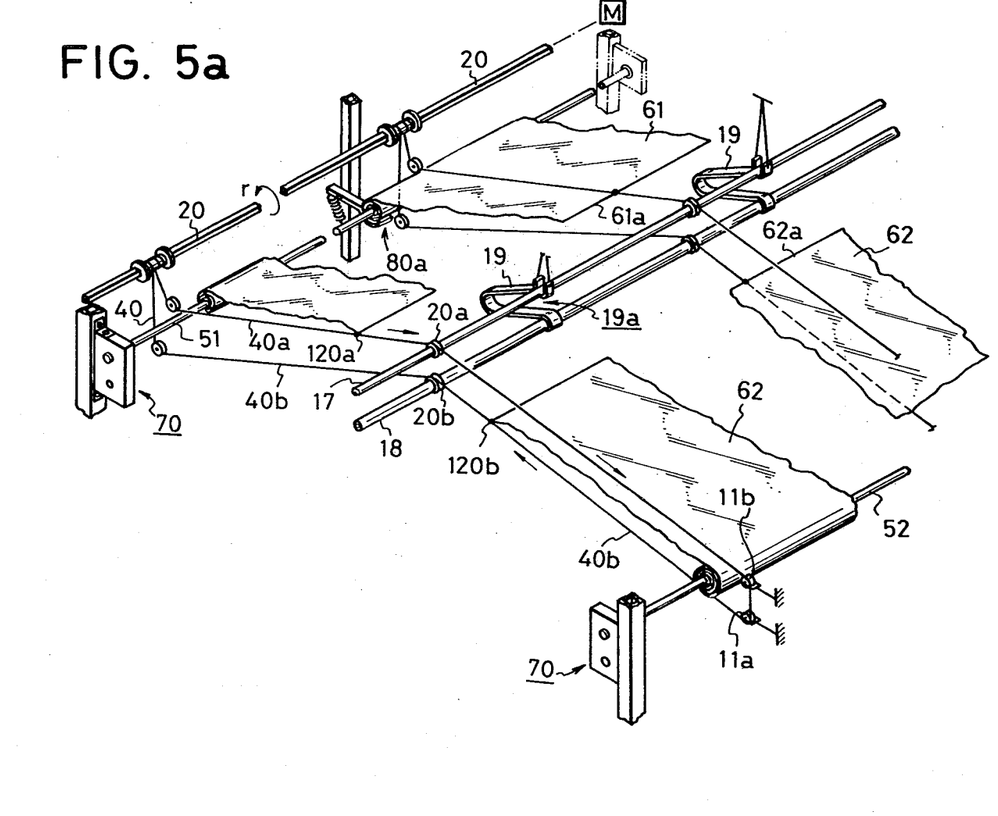
FIG. 5a is a perspective view showing another embodiment of the flexible screen opening and closing apparatus according to the present invention.
Figure 5B:
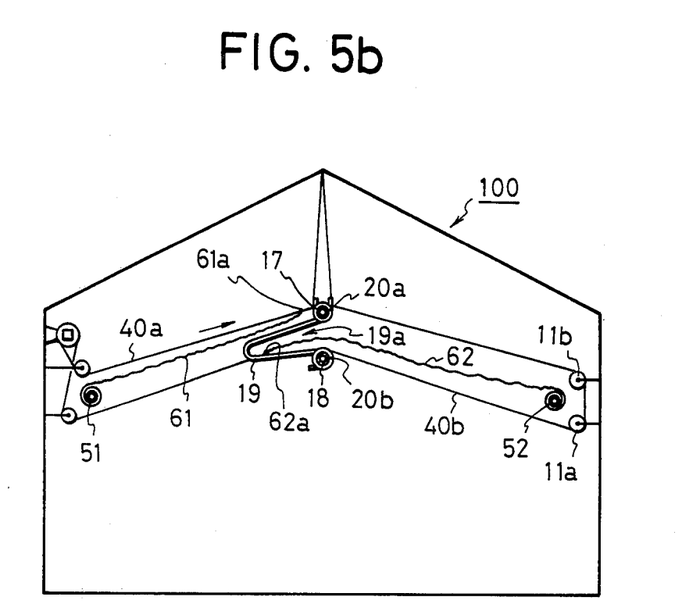
FIG. 5b is a schematic view of the embodiment of FIG. 5a as taken from a side.

A second embodiment of the present invention will now be described. Referring to FIGS. 5a and 5b, this embodiment is adapted to open or close a pair of flexible screens 61 and 62 by moving them simultaneously in an opposed relation, and for this purpose, a pair of winding rods 51 and 52 are provided for the respective screens 61 and 62, with a driving mechanism 70 being provided for each of said winding rods. As seen in FIGS. 5a and 5b, a pair of parallel center crossbeams 17 and 18 are disposed in vertical relation to each other near the center of the greenhouse 100, these crossbeams being supported by metal fittings 19 suspended in the greenhouse 100. Each of said suspended metal fittings 19 has a recession 19a into which the moving edge of one of the flexible screens 62 can enter after passing over the lower center beam 18. Guide pulleys 20a and 20b are rotatably mounted on the respective center beams 17 and 18. Both flexible screens 61, 62 are secured to the traction ropes 40 by clips 120a, 120b so that one of the flexible screens 61 is pulled in its opening or closing direction by the travelling portions 40a of the respective ropes 40 while the other screen 62 is pulled by the travelling portions 40b of the ropes 40. Thus, when the driving shaft 20 rotates in the direction of arrow r, said pair of screens 61 and 62 are urged to move simultaneously toward the center beams 17 and 18 to obtain their "closed" position, and when said driving shaft 20 rotates reversely, both screens 61, 62 are caused to move in the opposite direction to obtain their "open" position. The condition where both flexible screens 61 and 62 have just completed their closing movement is shown in FIG. 5b. Since the portions of both screens 61, 62 near their leading end edges 61a, 62a overlap each other in the closed position, leakage of warm air is prevented thereby improving the heat-retaining effect. In the drawings, reference numerals 11a and 11b denote guide pulleys and 80a a rolled screen supporting member.

Whether only a single screen is used as in the above-described first embodiment or two screens are used as in the second embodiment discussed immediately above, is suitably determined according to the desired width of partition to be formed in the greenhouse, the thickness of the screen material used as well as other factors, and it is clear that the present invention can be equally applied to both of such cases.

The device of this invention has many other advantageous practical effects. For example, the device is easy to assemble and install because of its simple structure, and it is possible to suitably adjust the number of the constant-restoring-force springs 15 in the driving mechanism 7 according to the rotational torque requirement of the winding rod 5.

Figure 6:
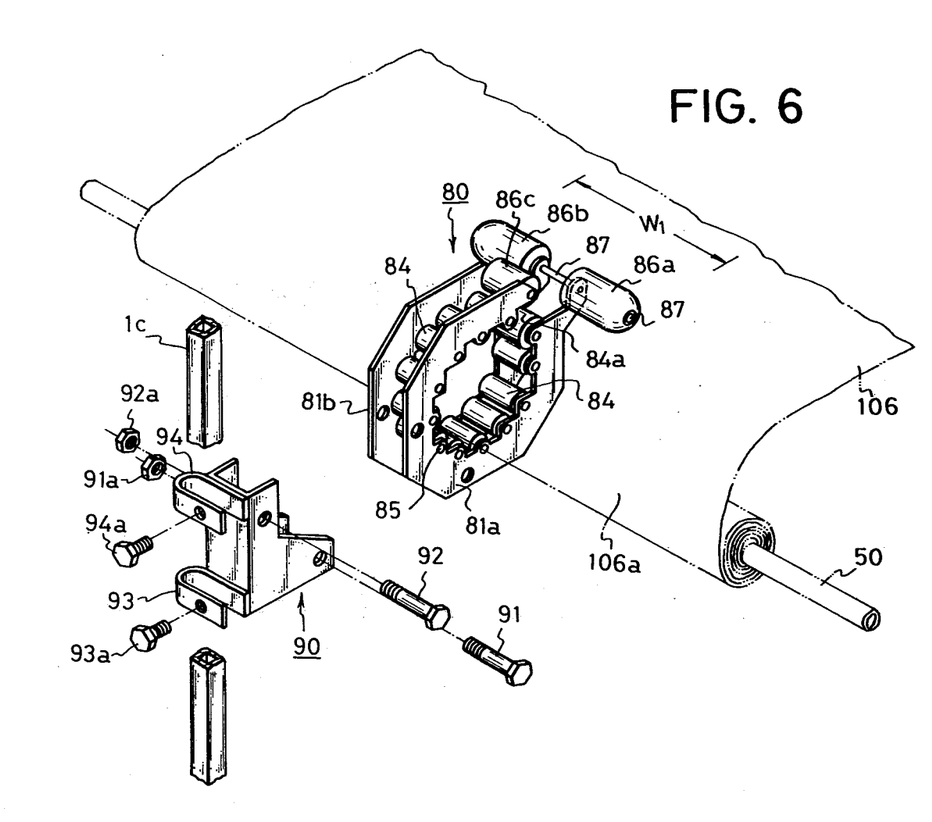
FIG. 6 is a partly exploded perspective view showing an embodiment of the rolled screen supporting member.
Figure 7:
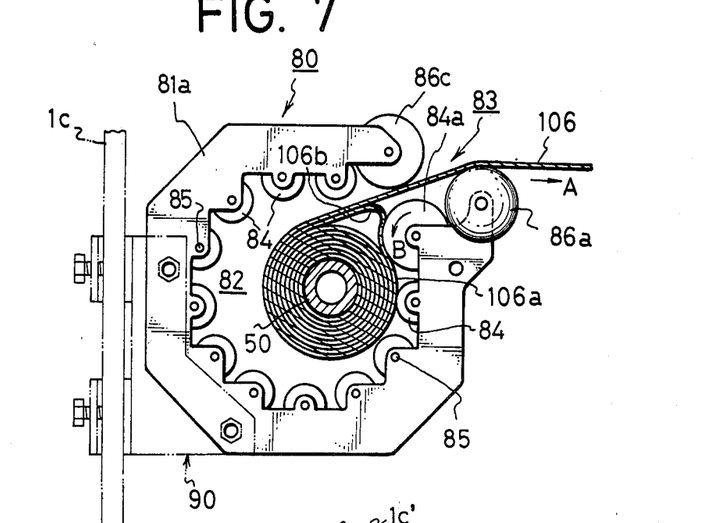
FIG. 7 is a side elevational view of the rolled screen supporting member in one mode of use.
Figure 8:
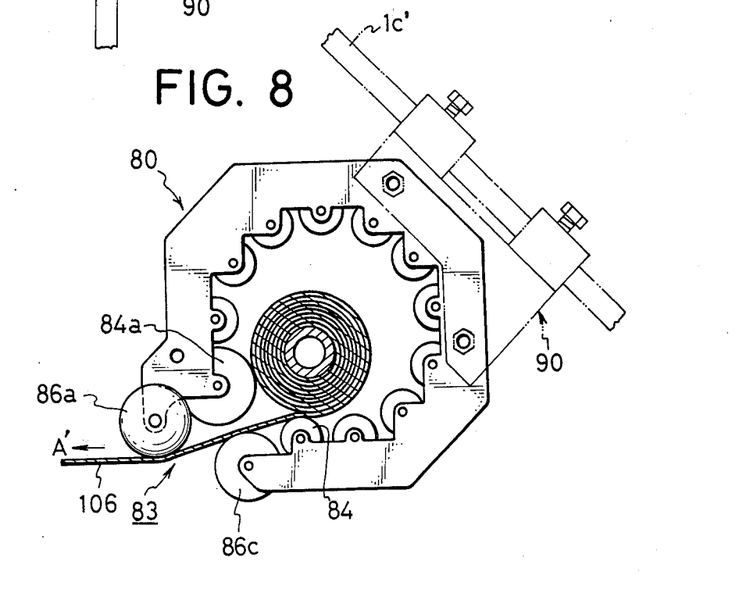
FIG. 8 is a side elevational view of the rolled screen supporting member in another mode of use.

Referring now to FIGS. 6 to 8, there is illustrated a modification of the rolled screen supporting members 8 and 80a shown in FIGS. 2 and 5a. This modification provides a supporting member which is capable of rotatably supporting the rolled screen in a stabilized way irrespsective of any change of the roll diameter of the rolled screen.

In FIGS. 6 to 8, 80 designates the body of the rolled screen supporting member and 90 denotes a metal fixture for fixing said supporting member to the greenhouse frame. A pair of side panels 81a and 81b are fixed in parallel relation to each other with a suitable spacing therebetween. The side panels 81a and 81b are centrally hollowed to define an opening 82 of a size that allows free passage therethrough of the rolled portion 106a of the screen 106. A screen delivery port 83 is provided at a pertinent location of the side panel assembly. A plurality of supporting rollers 84, 84, . . . are arranged along the periphery of said rolled screen receiving hole 82, each of said rollers 84,84 . . . being rotatably supported by a pivot pin 85 passed across both side panels 81a and 81b. Among said supporting rollers 84, 84, . . . , the roller 84a located at an end of the screen delivery port 83 is larger in diameter than the other rollers. Screen guide rollers 86a, 86b and 86c are provided, of which the rollers 86a and 86b are positioned at the outer end of said screen delivery port 83, on the side closer to the large-diameter supporting roller 84a, and rotatably supported by a pivot pin 87 so that they project outside of the side panels 81a and 81b. The body portion 80 of the rolled screen supporting member is partly fitted in the metal fixture 90 and fixed in position by bolts 91, 92 and nuts 91a, 92a, and further the fixture 90 is fixed to the side wall frame 1c by bolts 93a, 94a at its clamping portions 93, 94. FIG. 7 illustrates the positional relation between the body portion 80 and the metal fixture 90 in the fitted and fixed state in case the assembly was secured to a vertical frame 1c, and FIG. 8 illustrates the similar relation in case the assembly was secured to a slanted frame 1c'. It will be appreciated that a feature of this embodiment is that the body portion 80 can be fixed to the metal fixture in a turned-over position as shown, thus allowing wider selection of the fixing position according to the shape and size of the greenhouse or the like.

Referring to FIG. 7, when the screen 106 is unwound as it is pulled in the direction of arrow A, the screen roll 106a on the winding rod 50 is forced to rotate while pressing against the supporting rollers 84, 84a under produced tension. Said supporting roller 84a is so arranged that the screen 106 is delivered out while guided by the guide rollers 86a and 86b and will not contact the supporting roller 84a in the course of its delivery, so that said supporting roller 84a is not subjected to any frictional resistance in the delivering direction of the screen 106 and is thus allowed to turn in the direction of arrow B so that it can support the screen roll on the winding rod without producing any sag such as shown by 106b on the screen roll 106a. Also, even if a slacking portion 106b should be produced on the screen 106 during said delivering operation due to a weak winding force of the winding rod 50, such slacking portion 106b is held back bulging out from the delivery port 83 as said supporting roller 84a has a greater diameter than the other rollers 84.

In the case where the delivery port 83 is positioned downwards as shown in FIG. 8, the screen 106, when pulled in the direction of arrow A', is delivered out by passing the supporting rollers 84 and guide rollers 86c and 86a successively in that order, so that all of the rollers 84, 84a, 86c and 86a are assured of free rotation to allow proper delivery of the flexible screen.

Another embodiment of winding rod in accordance with the present invention is illustrated in FIGS. 9a to 9e. The winding rod of this embodiment has large-diameter bulging portions and reduced-diameter portions arranged alternately. A better effect is obtained through the use of this winding rod in combination with the rolled screen supporting members shown in FIGS. 6 to 8. Provision of said large-diameter bulging portions 122 is intended to allow a uniform winding of the screen 106 on the winding rod 150 as explained below. For this purpose, it is more desirable to arrange the supporting rollers 84 in the body of the rolled screen supporting member 80 (shown in FIG. 6) such that said supporting rollers 84 will confront either one of said bulging portions 122 so that the screen 106 is smoothly wound around such bulging portion 122.

In case the winding rod shown in FIGS. 9a to 9e is used in combination with the rolled screen supporting member shown in FIGS. 6 to 8, the guide rollers 86a and 86b (FIG. 6) can function to facilitate smooth winding of the screen 106 on the winding rod. In this case, if the width $W_1$ between the outer end faces of the guide rollers 86a and 86b is adjusted to be equal to the width $W_2$ of one bulging portion 122, it becomes possible to reliably feed the smooth screen 106 under a constant tension around said large-diameter bulging portions 122.

The reason for employing a winding rod having such bulging portions is explained below.

Figure 9A:
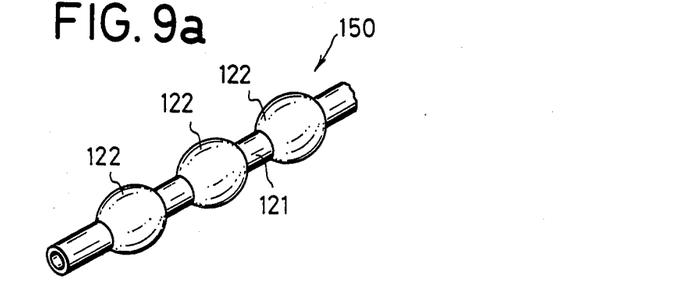
FIG. 9a is a perspective view showing one embodiment of a winding rod.
Figure 9B:
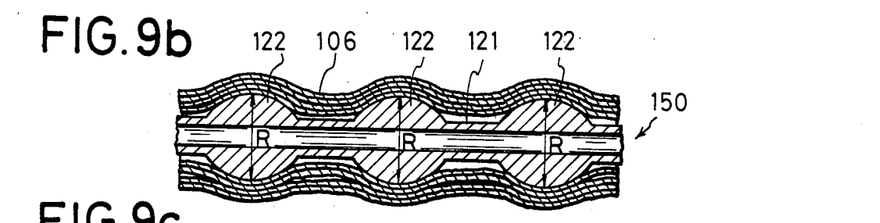
FIGS. 9b to 9e are longitudinal sectional views showing other embodiments of a winding rod.
Figure 9C:
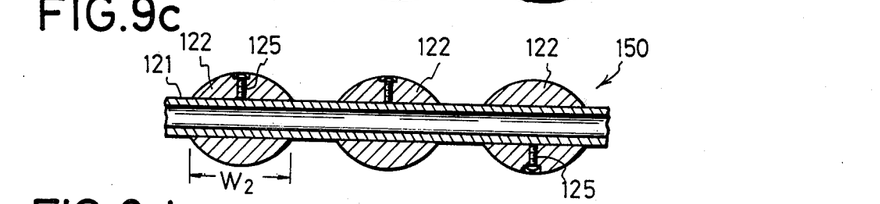
Figure 9D:
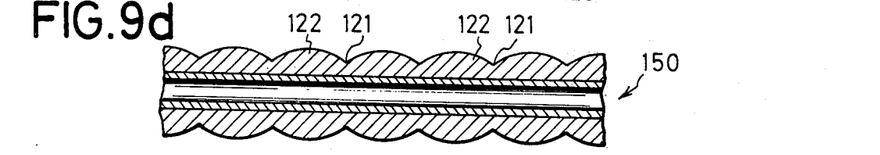
Figure 9E:
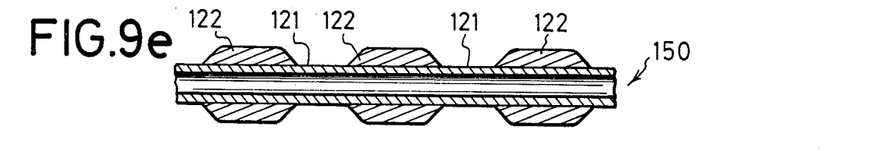

In the past, a straight bar or straight pipe section having a circular or polygonal sectional shape has been used as the winding rod of the type discussed. However, it is impossible with such winding rod to wind up a long and broad flexible screen into a perfectly uniform roll. Due to slacking along the center axis of rotation of the elongated winding rod, partial stretching of the flexible screen itself and other reasons, many wrinkles and kinks of various sizes are produced on the screen surface to which the winding tension is exerted. If such rumpled or kinked parts are wound up, unevenness is produced on the rolled screen surface, and if winding is further continued under such condition, the roll of screen on the winding rod becomes non-uniform in roll diameter along the length of the winding rod, resulting in a non-uniform winding speed of the tensioned screen on the winding rod, and as a consequence, an excess tensile force is exerted locally to the screen to cause partial stretch, slack or cuts or to further amplify said rumples and kinks. Also, such partial stretch or slack on the flexible screen causes irregularity along the edge of the screen when the screen is unwound to close the partition plane in the greenhouse, thus making it unable to form a perfect partition. Such trouble can be eliminated by employing the winding rods 150 having the structures such as shown in FIGS. 9a to 9e. These winding rods 150 consist of the small-diameter portions 121, which comprise the body portion of the rod and are made of a metal or the like, and the bulging portions 122. The bulging portions 122 are arranged at suitable intervals alternately with the small diameter portions 121 and have the same maximum diameter R. These portions 122 preferably have a gentle-sloping arcuate section as shown in FIGS. 9b to 9d or a substantially trapezoidal section as shown in FIG. 9e.

When the winding rod 150 is rotated in the screen-winding direction, the screen 106 is wound up thereon with the screen portion around each said bulging portion 122 being wound tight and tense while the screen portion around each small-diameter portion 121 being wound more loosely as shown in FIG. 9b. Therefore, even if wrinkles and/or kinks exist on the screen 106 which is to be wound on the winding rod 105, such wrinkles or kinks on the screen portion which is wound on the large-diameter bulging portions 122 are wedged away under the tensile force toward the small-diameter portions 121 on both sides thereof while the wrinkles, etc., on the screen portion to be wound on the small-diameter portions 121 of the winding rod are allowed to stay as they are on said screen portion. Thus, no wrinkles, etc., are allowed to exist on the screen portion wound around each large-diameter bulging portion 122 of the winding rod, and hence the roll diameter on such portion of the winding rod steadily and regularly increases as the screen 106 is rolled up. On the other hand, the roll diameter on the small-diameter portions of the winding rod, where wrinkles, etc., are gathered, never exceeds the roll diameter on the large-diameter bulging portions 122. Therefore, the screen 106 is rolled up at a uniform speed along the full length of the winding rod 150 and thus remains safe from any trouble such as cuts in the winding operation. Also, since the roll diameter remains constant along the entire length of the winding rod 150, said winding rod produces no slack along the center axis of rotation thereof and is allowed to rotate smoothly even when said winding rod is given a rotative force at its one end.

Although said large-diameter bulging portions 122 may be formed integrally with the material of the small-diameter portions 121 as shown in FIG. 9b, they may be also formed as separate elements by plastic molding or other means, and a rod which is to constitute the small-diameter portions 121 may be passed through said hollowed elements, which are then secured to said rod by suitable means such as set screws 125 or an adhesive. Also, the large-diameter bulging portions 122 and small-diameter portions 121 may be arranged either as shown in FIG. 9d wherein a tubular member having an outer surface defining the alternating large and reduced diameter portions is positioned over a rod, or as shown in FIGS. 9b, 9c and 9e. In either case, the large-diameter portions 122 and small-diameter portions 122 are arranged alternately with each other.

Obviously, numerous modifications and variations are possible in the light of the above teachings. It is therefore to be understood that the invention may be varied within the scope of the claims appended hereto.

What is claimed is:

1. Apparatus for opening and closing a flexible screen of a greenhouse or the like of the type wherein an end edge of the flexible screen is fixed to a winding rod and wherein the screen is opened or closed by winding the screen onto the winding rod or unwinding the screen from the winding rod respectively, comprising:

an elongated winding rod mounted for rotation about a fixed axis of rotation, said elongated winding rod having alternating large diameter and reduced diameter portions;

an elongated flexible screen fixed at an end edge thereof to said winding rod and windable thereon to form a rolled screen;

rolled screen supporting means for supporting the rolled screen wound on said winding rod including a casing defining an opening for receiving said rolled screen and a screen delivering slit, a plurality of rolled screen supporting rollers rotatably supported in said casing and arranged to support said rolled screen in said opening along the periphery thereof, and rollers provided in the region of said screen delivering slit for guiding said screen which passes therethrough;

traction means operatively connected to the other end edge of said flexible screen for selectively pulling said flexible screen in either one of opening and closing directions, said traction means including an elongated driving shaft mounted for rotation about a fixed axis of rotation, second driving means for selectively rotating said driving shaft in either one of normal and reverse directions, elongated flexible members each of which has its two ends secured to said driving shaft with respective end portions thereof being coiled on said driving shaft opposite to each other, guide means for guiding two portions of each of said flexible members over a predetermined path of travel, and wherein each of said flexible members is operatively connected at one of said two portions thereof to said flexible screen; and first driving means for constantly applying a substantially constant restoring force to said winding rod tending to rotate the same about its fixed axis of rotation in a direction such that said flexible screen would be wound onto said winding rod, said first driving means including a casing, a constant-restoring-force spring housed in said casing, an output shaft rotatably supported in said casing, said spring being coiled thereon with an end of said spring being fixed to said output shaft, and a main shaft rotatably supported in said casing and having coiled thereon the other free end of said spring, and wherein at least one end of said winding rod is operatively connected to said output shaft.

2. The combination of claim 1 wherein said elongated winding rod constitutes a unitary member, said large diameter portions being formed integrally with the material of the reduced diameter portions.

3. The combination of claim 1 wherein said elongated winding rod comprises a rod and separate elements fixed to said rod in spaced relationship to each other, the portions of said rod located between said separate elements constituting said reduced diameter portions and said separate elements constituting said large diameter portions.

4. The combination of claim 1 wherein said elongated winding rod comprises a rod and a tubular member positioned over said rod having an outer surface defining the alternating large and reduced diameter portions.

* * * * *